(12) United States Patent
Fargo

(10) Patent No.: US 10,587,180 B2
(45) Date of Patent: Mar. 10, 2020

(54) MAGNETIC ELEVATOR DRIVE MEMBER AND METHOD OF MANUFACTURE

(71) Applicant: OTIS ELEVATOR COMPANY, Farmington, CT (US)

(72) Inventor: Richard N. Fargo, Plainville, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 773 days.

(21) Appl. No.: 15/154,148

(22) Filed: May 13, 2016

(65) Prior Publication Data

US 2017/0331360 A1   Nov. 16, 2017

(51) Int. Cl.
| | |
|---|---|
| H02K 49/10 | (2006.01) |
| B66B 9/02 | (2006.01) |
| H02K 1/27 | (2006.01) |
| B23K 9/23 | (2006.01) |
| B23K 9/12 | (2006.01) |
| B23K 9/173 | (2006.01) |
| B23K 9/04 | (2006.01) |
| H02K 15/03 | (2006.01) |
| B23K 103/04 | (2006.01) |
| H02K 7/06 | (2006.01) |
| B33Y 10/00 | (2015.01) |
| B33Y 80/00 | (2015.01) |
| B66B 11/04 | (2006.01) |

(52) U.S. Cl.
CPC .......... *H02K 49/102* (2013.01); *B23K 9/048* (2013.01); *B23K 9/124* (2013.01); *B23K 9/173* (2013.01); *B23K 9/23* (2013.01); *B66B 9/025* (2013.01); *H02K 1/2706* (2013.01); *H02K 15/03* (2013.01); *B23K 2103/04* (2018.08); *B23K 2103/05* (2018.08); *B33Y 10/00* (2014.12); *B33Y 80/00* (2014.12); *B66B 11/0438* (2013.01); *H02K 7/06* (2013.01)

(58) Field of Classification Search
CPC ...... H02K 15/03; H02K 49/102; B23K 9/048; B23K 9/123; B23K 9/173; B23K 9/23
USPC ........................................ 310/156.19, 156.08
See application file for complete search history.

(56) References Cited

U.S. PATENT DOCUMENTS

| | | | |
|---|---|---|---|
| 2,709,213 A | 5/1955 | Gibson | |
| 3,985,995 A | 10/1976 | Brandi et al. | |
| (Continued) | | | |

FOREIGN PATENT DOCUMENTS

| | | |
|---|---|---|
| CN | 101117193 A | 2/2008 |
| CN | 101951038 A | 1/2011 |
| (Continued) | | |

OTHER PUBLICATIONS

Soft Magnetic Materials . . . , Science Direct Topics (Year: 2013).*

(Continued)

*Primary Examiner* — Terrance L Kenerly
(74) *Attorney, Agent, or Firm* — Carlson, Gaskey & Olds

(57) ABSTRACT

An illustrative example embodiment of a method of making a rotary magnetic drive member includes establishing a plurality of magnet retainers on a rod using an additive manufacturing process. Magnets are inserted between the retainers with magnetic poles of axially adjacent ones of the magnets oriented with like poles facing toward a portion of one of the retainers between the adjacent ones of the magnets.

13 Claims, 2 Drawing Sheets

(56) References Cited

U.S. PATENT DOCUMENTS

| | | | |
|---|---|---|---|
| 4,402,386 A | | 9/1983 | Ficheux et al. |
| 5,079,458 A | * | 1/1992 | Schuster ................ H02K 41/00 |
| | | | 310/12.26 |
| 5,465,433 A | | 11/1995 | Nolan |
| 5,467,850 A | | 11/1995 | Skalski |
| 5,535,853 A | * | 7/1996 | Skalski ................... B66B 7/042 |
| | | | 187/292 |
| 5,734,209 A | * | 3/1998 | Hallidy ................. E21B 43/128 |
| | | | 310/12.04 |
| 5,913,401 A | | 6/1999 | Tamura et al. |
| 7,124,495 B2 | | 10/2006 | Gieras et al. |
| 7,195,107 B2 | | 3/2007 | Gauthier et al. |
| 7,663,282 B2 | | 2/2010 | Ogava |
| 7,881,602 B2 | | 2/2011 | Aoshima |
| 9,010,498 B2 | | 4/2015 | Hsieh |
| 9,206,016 B2 | | 12/2015 | Breidenstein et al. |
| 2004/0108360 A1 | | 6/2004 | Tappan et al. |
| 2004/0202797 A1 | * | 10/2004 | Ginder .................... H01F 41/16 |
| | | | 427/598 |
| 2007/0024141 A1 | * | 2/2007 | Drexlmaier ............ H02K 1/278 |
| | | | 310/156.19 |
| 2008/0093945 A1 | | 4/2008 | Gruenhagen |
| 2008/0179142 A1 | | 7/2008 | Chuo et al. |
| 2009/0251258 A1 | | 10/2009 | Rhinefrank et al. |
| 2011/0061976 A1 | | 3/2011 | Tiner |
| 2013/0026872 A1 | * | 1/2013 | Cirani ................... H02K 1/2766 |
| | | | 310/156.08 |
| 2013/0248296 A1 | * | 9/2013 | Husmann .................... B66B 5/12 |
| | | | 187/251 |
| 2013/0249324 A1 | * | 9/2013 | Gandhi ................ H02K 41/033 |
| | | | 310/12.18 |
| 2013/0270956 A1 | * | 10/2013 | Yamaguchi ............... H02K 1/27 |
| | | | 310/156.27 |
| 2015/0171671 A1 | | 6/2015 | Tunhunen et al. |
| 2015/0307325 A1 | | 10/2015 | Fargo |
| 2015/0360908 A1 | | 12/2015 | Chen |
| 2015/0368071 A1 | * | 12/2015 | Witczak .................... B66B 9/02 |
| | | | 187/250 |
| 2017/0117760 A1 | | 4/2017 | Greenlaw et al. |
| 2018/0330858 A1 | * | 11/2018 | Tangudu ................. H01F 7/021 |

FOREIGN PATENT DOCUMENTS

| | | |
|---|---|---|
| CN | 201854099 U | 6/2011 |
| CN | 102556809 A | 7/2012 |
| CN | 202334033 U | 7/2012 |
| CN | 102741005 A | 10/2012 |
| CN | 103057548 A | 4/2013 |
| CN | 103801799 A | 5/2014 |
| CN | 203734397 U | 7/2014 |
| CN | 104781178 A | 7/2015 |
| DE | 19910473 | 9/2000 |
| DE | 102010046060 A1 | 3/2012 |
| DE | 102013212616 | 12/2014 |
| EP | 0569594 | 11/1993 |
| EP | 1870985 A1 | 12/2007 |
| EP | 2978104 | 1/2016 |
| JP | 2006180677 A | 7/2006 |
| WO | 94/14695 | 7/1994 |
| WO | 0210051 A2 | 2/2002 |
| WO | 02057171 A1 | 7/2002 |
| WO | 03052901 A1 | 6/2003 |
| WO | 2009106789 | 9/2009 |
| WO | 2011042036 A1 | 4/2011 |
| WO | 2011/080390 A1 | 7/2011 |
| WO | 2014030906 A1 | 2/2014 |
| WO | 2014074379 | 5/2014 |
| WO | 2014/182272 A1 | 11/2014 |
| WO | 2015/023263 A1 | 2/2015 |
| WO | 2015062973 | 5/2015 |

OTHER PUBLICATIONS

The Extended European Search Report for EP Application No. 17171088.2, dated Oct. 24, 2017.

Extended European Search Report for Application No. EP 17 17 1151 dated Sep. 27, 2017.

CN Application No. 201710342166.5, First Search dated Aug. 26, 2018.

* cited by examiner

MAGNETIC ELEVATOR DRIVE MEMBER AND METHOD OF MANUFACTURE

BACKGROUND

Elevator systems are in widespread use. The mechanism for propelling an elevator car may be hydraulic or traction-based. Modernization efforts have recently focused on replacing round steel ropes in traction-based systems with lighter weight belts, for example, and reducing the size of the machine components.

It has more recently been proposed to change elevator propulsion systems to include a magnetic drive. Linear and rotary magnetic drive arrangements are known in various contexts. It has recently been proposed to include a rotary magnetic arrangement for propelling an elevator car. One such arrangement is described in the United States Patent Application Publication No. US 2015/0307325. While such arrangements have potential benefits and advantages, implementing them on a commercial scale is not without challenges. For example, material and manufacturing costs could become prohibitively expensive. Another issue presented to those skilled in the art is how to realize an arrangement of components to ensure efficient and reliable operation.

SUMMARY

An illustrative example embodiment of a method of making a rotary magnetic drive member includes establishing a plurality of magnet retainers on a rod using an additive manufacturing process. Magnets are inserted between the retainers with magnetic poles of axially adjacent ones of the magnets oriented with like poles facing toward a portion of one of the retainers between the adjacent ones of the magnets.

In an example embodiment having one or more features of the method of the previous paragraph, the additive manufacturing process comprises wire arc additive manufacturing.

In an example embodiment having one or more features of the method of either of the previous paragraphs, the magnet retainers comprise a magnetic material.

In an example embodiment having one or more features of the method of any of the previous paragraphs, the magnetic material comprises low carbon steel.

An example embodiment having one or more features of the method of any of the previous paragraphs includes shaping the magnet retainers to include a retention feature on the magnet retainers that maintains the magnets near the rod.

In an example embodiment having one or more features of the method of any of the previous paragraphs, shaping the magnet retainers comprises removing a portion of the magnet retainers to establish a first axial distance between the magnet retainers distal from the rod and a second axial distance between the magnet retainers near the rod with the first axial distance being smaller than the second axial distance.

In an example embodiment having one or more features of the method of any of the previous paragraphs, removing the portion of the magnet retainers comprises machining away a portion of the magnet retainers.

In an example embodiment having one or more features of the method of any of the previous paragraphs, shaping the magnet retainers comprises providing the magnet retainers with a dovetail shaped cross-section.

In an example embodiment having one or more features of the method of any of the previous paragraphs, establishing the plurality of magnet retainers comprises arranging the magnet retainers in a helical arrangement on the rod.

In an example embodiment having one or more features of the method of any of the previous paragraphs, inserting the magnets comprises positioning at least one of the magnets at least partially in a gap between the magnet retainers near one end of the rod, and moving the at least one of the magnets within the gap in a helical direction along the rod toward an opposite end of the rod into a desired location.

An example embodiment having one or more features of the method of any or the previous paragraphs includes sequentially performing the positioning for each of the magnets, and moving a plurality of the magnets simultaneously.

In an example embodiment having one or more features of the method of any of the previous paragraphs, the rod comprises a non-magnetic material.

In an example embodiment having one or more features of the method of any of the previous paragraphs, the rod comprises a hollow cylinder.

In an example embodiment having one or more features of the method of any of the previous paragraphs, the magnets respectively have an outwardly facing surface, a distance from a center of the rod to the outwardly facing surfaces is approximately 100 mm, and a length of the rod is approximately 500 mm.

In an example embodiment having one or more features of the method of any of the previous paragraphs, the magnets comprise a ceramic compound.

In an example embodiment having one or more features of the magnetic drive member of any of the previous paragraphs, the magnets comprise rare earth magnets.

An illustrative example magnetic drive member includes a non-magnetic rod, a plurality of magnetic magnet retainers on the rod, and a plurality of magnets. The plurality of magnetic magnet retainers have an axial spacing between adjacent portions of the magnet retainers. The axial spacing has a first dimension distal from the rod and a second, larger dimension closer to the rod. The plurality of magnets are within the spacing with magnetic poles of axially adjacent ones of the magnets oriented with like poles facing toward a portion of one of the magnet retainers between the adjacent ones of the magnets. The magnets respectively have a first outside dimension corresponding to the first dimension of the spacing and a second outside dimension corresponding to the second dimension of the spacing.

In an example embodiment having one or more features of the magnetic drive member of the previous paragraph, the magnet retainers have a dovetail shaped cross-section.

In an example embodiment having one or more features of the magnetic drive member of either of the previous paragraphs, the rod comprises a hollow cylinder, and the magnet retainers are in a helical arrangement on the rod.

In an example embodiment having one or more features of the magnetic drive member of any of the previous paragraphs, the magnets respectively have an outwardly facing surface, a distance from a center of the rod to the outwardly facing surfaces is approximately 100 mm, and a length of the rod is approximately 500 mm.

In an example embodiment having one or more features of the magnetic drive member of any of the previous paragraphs, the magnets comprise a ceramic compound.

In an example embodiment having one or more features of the magnetic drive member of any of the previous paragraphs, the magnets comprise rare earth magnets.

The various features and advantages of at least one disclosed example embodiment will become apparent to those skilled in the art from the following detailed description. The drawings that accompany the detailed description can be briefly described as follows.

DETAILED DESCRIPTION

Example embodiments of this invention provide a magnetic screw or drive member for propelling an elevator car. Embodiments of a method of manufacturing such a magnetic drive member provide a cost-effective approach that results in an economical, effective and reliable magnetic drive member that is useful in an elevator system, for example.

Figure 1:
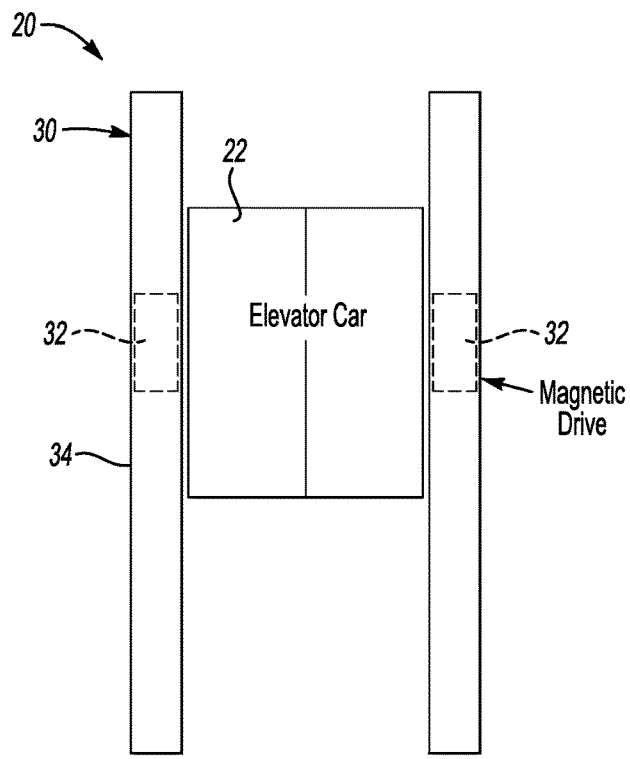
FIG. 1 schematically illustrates selected portions of an elevator system designed according to an embodiment of this invention.

FIG. 1 schematically illustrates selected portions of an elevator system 20. An elevator car 22 is situated within a hoistway for vertical movement between landings, such as building levels. A magnetic drive arrangement 30 includes a rotary magnetic drive member 32 and a stationary magnetic drive member 34. In the illustrated example, the rotary magnetic drive member 32 is supported for movement with the elevator car 22 relative to the stationary member 34.

FIG. 1 schematically shows a ropeless elevator system. The magnetic drive arrangement 30 may be used instead of a hydraulic or traction-based elevator propulsion arrangement. Alternatively, the magnetic drive arrangement 30 may be used in a roped elevator system in which the elevator car 22 is coupled with a counterweight and the magnetic drive 30 provides the force for moving the elevator.

Figure 2:
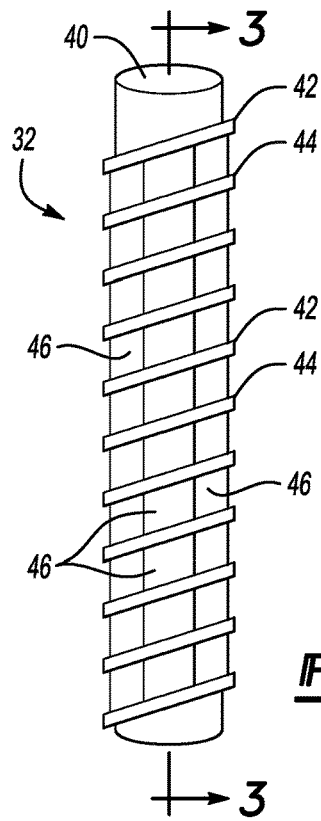
FIG. 2 diagrammatically illustrates selected features of an example magnetic drive member designed according to an embodiment of this invention.

FIG. 2 illustrates an example embodiment of the magnetic drive member 32. In this embodiment, the drive member 32 may be considered a magnetic screw that can be rotated for purposes of interacting with cooperative features of the magnetic drive arrangement 30 to cause desired movement of the elevator car 22. The magnetic drive member 32 in this example comprises a rod 40 made of a non-magnetic material. In the illustrated example, the rod 40 comprises a hollow cylinder. In one example, the rod comprises an austenitic stainless steel. Other non-magnetic materials may be used to meet the needs of a particular situation. A variety of rod configurations may be used in different embodiments.

A plurality of magnetic magnet retainers 42 and 44 are situated on and secured to the rod 40 in a helical arrangement. The magnet retainers 42 and 44 have spacing between them for receiving and retaining a plurality of magnets 46.

Figure 3:
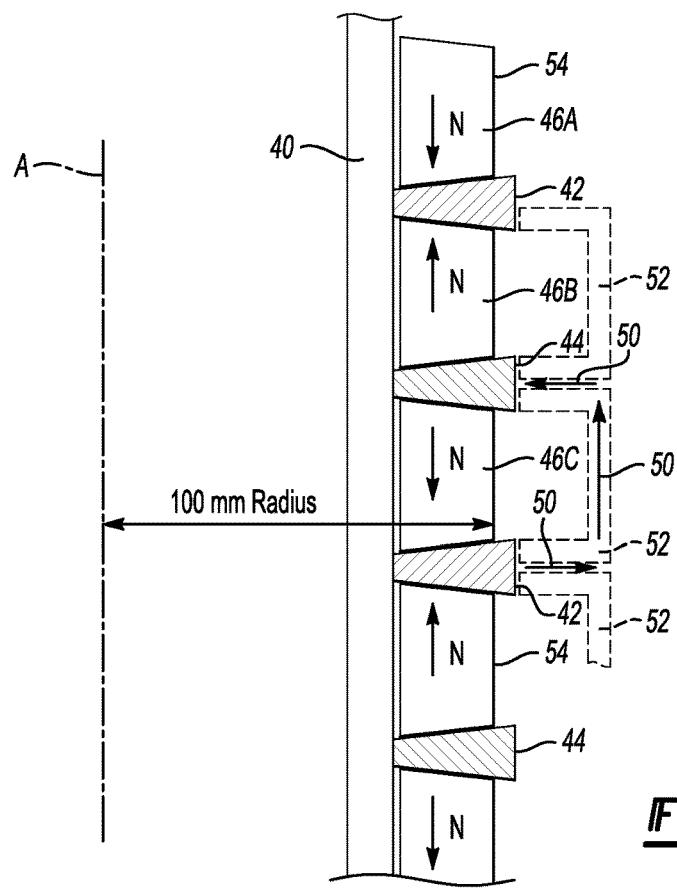
FIG. 3 is a cross-sectional illustration schematically illustrating selected features of the example embodiment of FIG. 2.

As shown in FIG. 3, the magnets 46 are situated within the spacing between the magnet retainers 42 and 44 with like poles of axially adjacent magnets facing toward a portion of one of the magnet retainers between those magnets. For example, the magnets 46A and 46B are adjacent to each other in an axial direction, which is parallel to a central, longitudinal axis A of the rod 40. The north pole of the magnet 46A is facing the north pole of the magnet 46B. The magnet retainer 42 includes a portion between the magnets 46A and 46B. The magnets 46B and 46C are axially adjacent each other with the south pole of each magnet facing the portion of the magnet retainer 44 between the magnets 46B and 46C. Such an arrangement of the magnets 46 is repeated along the length of the magnetic drive member 32.

With the magnetic poles arranged as schematically shown in FIG. 3, a plurality of magnetic flux paths are established along the length of the magnetic drive member 32 for interacting with a correspondingly configured stator or stationary magnetic drive member to cause movement of the elevator car 22 in a vertical direction. An example flux path is shown at 50 where magnetic flux emanates outward from one of the magnet retainers 42 between north poles of the adjacent magnets 46, through an appropriate portion of the stationary magnetic drive member 34, such as a metallic teeth as schematically illustrated in phantom at 52, and back toward a magnet retainer 44 between south poles of nearby adjacent magnets 46. Given that the operation of linear and rotary magnetic drives is generally known, no further explanation need be provided within this description regarding how magnetic flux and rotary motion results in a linear or vertical movement.

One feature of the magnet retainers 42 and 44 is that they comprise a magnetic material. One example includes low carbon steel. The magnet retainers 42 and 44 concentrate the flux levels of the nearby magnets and provide for a consistent flux level at each of the locations of the magnet retainers 42 and 44. The flux concentration provided by the magnetic material of the magnet retainers provides reliable and effective control over the direction of the flux paths 50 and the consistency or uniformity of flux levels along the length of the magnetic drive member 32. The magnet retainers 42 and 44 effectively eliminate variation of flux levels between the magnets 46, which may otherwise cause iron losses in the stator or stationary magnetic drive member 34.

Another feature of the magnet retainers 42 and 44 is that they allow for using lower cost magnets 46. The illustrated example includes magnets made of a ceramic compound. Some embodiments include ferrite magnets comprising a non-conductive ferrite ceramic compound derived from an iron oxide, such as hematite ($Fe_2O_3$) or magnetite ($Fe_3O_4$). Such magnets may present significant cost savings compared to arrangements that require other more expensive magnet materials. The magnet retainers 42 and 44 effectively filter out any effects of lower magnetic flux between the magnets 46. Some embodiments include rare earth magnets.

Another feature of the illustrated example embodiment is that it allows for making the magnetic drive member 32 relatively smaller while still providing the ability to achieve sufficient driving forces for propelling an elevator car as desired. In one example embodiment, the magnets 46 have an outwardly facing surface 54 that is approximately 100 mm away from the central axis A of the rod 40. One such embodiment includes a 500 mm long rod. One embodiment having a 200 mm diameter of the magnet drive member 32 with a 500 mm length provides 10,000 Newtons of vertical force, which is sufficient for a variety of elevator installations.

Figure 4:
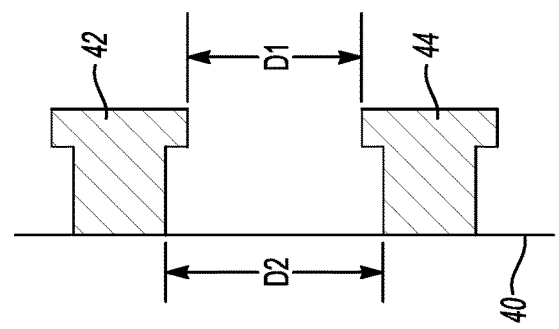
FIG. 4 schematically illustrates selected features of the embodiment of FIGS. 2 and 3.

As can be appreciated from FIGS. 3 and 4, the magnet retainers 42 and 44 have a dovetail cross-section. The magnet retainers 42 and 44 are situated on the rod 40 with a first axial dimension or distance D1 between the magnet retainers distal from the rod 40. A second axial distance or dimension D2 separates the magnet retainers 42 and 44 closer to the rod 40. With the gap between the magnet retainers 42 and 44 having different dimensions as illustrated, the magnet retainers effectively maintain the magnets 46 within that gap and against or near the rod 40. Even when the magnetic drive member 32 is used at a high rotational speed, the magnet retainers 42 and 44 maintain the magnets in a desired position relative to the rod 40.

Figure 5:
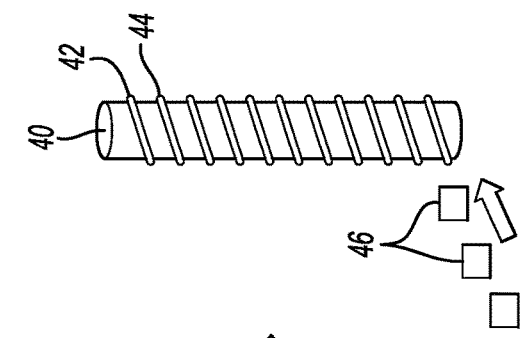
FIG. 5 schematically illustrates selected features of another example embodiment.

FIG. 5 illustrates another example arrangement in which the magnet retainers 42 and 44 have spacings D1 and D2 between them distal from and close to the rod 40, respectively. Those skilled in the art who have the benefit of this description will realize that there are a variety of configurations of magnet retainers that will provide concentration of the magnetic flux and retain the magnets against the rod.

One feature of using magnet retainers 42 and 44 as included in the illustrated embodiments is that it reduces any requirement for wrapping the magnetic drive member 32 in carbon fiber for retaining the magnets 46 in place. One drawback to using such a wrap in some previous rotary magnetic drive arrangements is the added effective air gap introduced by the wrap, which reduces the magnetic effectiveness of the system and potentially introduces variation of flux levels between magnet segments. It is possible to use a fiberglass or carbon fiber material wrapped around the magnets 46 without covering the magnet retainers 42 and 44. Without covering the outwardly facing surfaces on the retainers 42 and 44, such a wrap or material is not in the air gap flux path. The magnet retainers 42 and 44 establish an improved magnetic circuit even in embodiments for which a magnet wrap would be useful, such as embodiments that are intended for higher rotational speeds.

Figure 6:
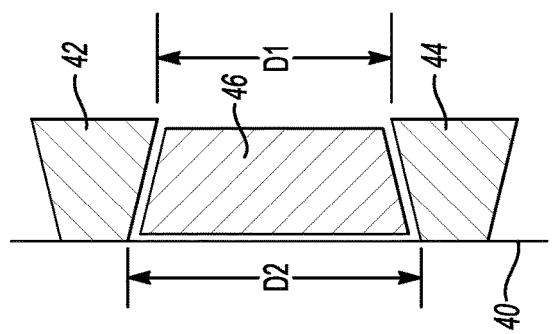
FIG. 6 schematically illustrates a method of manufacturing a magnetic drive member designed according to an embodiment of this invention.
Figure 6:
Figure 6:
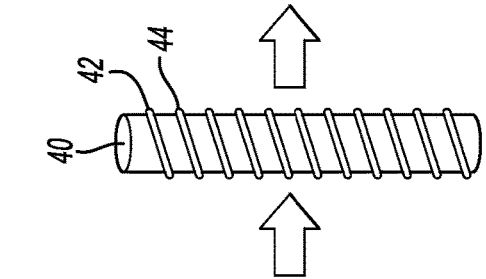
Figure 6:
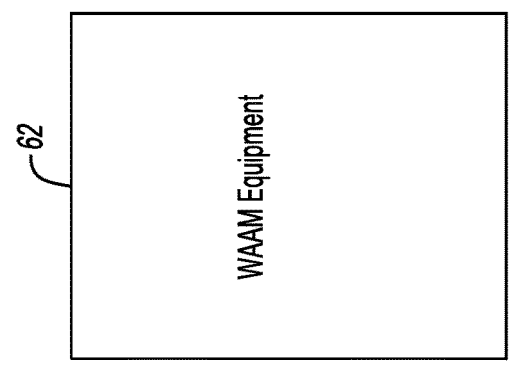
Figure 6:
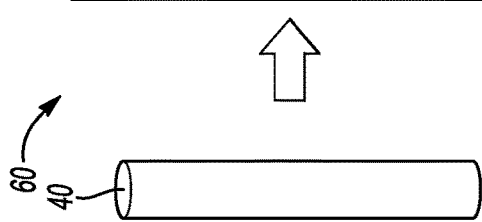

FIG. 6 schematically illustrates an example process 60 for making a magnetic drive member designed according to an embodiment of this invention. Additive manufacturing equipment 62 is utilized for establishing the magnet retainers 42 and 44 on the rod 40. In the illustrated example, the magnet retainers are established using a wire arc additive manufacturing technique or a wire feed additive manufacturing technique. Such techniques are generally known.

In the example of FIG. 6, after the additive manufacturing, at least some of the material that was added by the additive manufacturing equipment 62 is removed by material removal equipment schematically shown at 64. One example includes turning the rod on a lathe for removing a portion of the material of the magnet retainers that was added to the rod 40 by the additive manufacturing process. The removal equipment 64 may be configured, for example, to establish a dovetail, cross-section as schematically shown in FIGS. 3 and 4.

Once the desired configuration of the magnet retainers 42 and 44 is established, a plurality of magnets 46 are inserted between the magnet retainers. Given that the magnet retainers 42 and 44 are in a helical arrangement in this example, the magnets 46 may be inserted into an appropriate gap and then manipulated around the rod in a helical path from one end of the rod 40 in a direction toward an opposite end of the rod 40 until the magnet is in a desired position. One example approach includes inserting a plurality of the magnets near one end of the rod 40 and simultaneously moving them or manipulating them along the helical path within the gap between corresponding magnet retainers 42 and 44 until all magnets are in a desired position.

The example technique shown in FIG. 6 includes reducing an amount of waste material associated with establishing the magnet retainers 42 and 44. A wire arc additive manufacturing process generates little waste. Relatively inexpensive magnets may be relatively simply put into place providing further cost savings during the manufacturing process. The resulting magnetic drive member does not require any wrapping, such as carbon fiber, to retain the magnets in a desired position relative to the rod 40. Instead, the magnet retainers 42 and 44, which also serve as magnetic flux concentrators, hold the magnets in place. Some example embodiments include impregnating or potting the magnets in place using an epoxy.

The example disclosed magnetic drive member 32 has increased magnetic efficiency compared to prior arrangements, which allows for using a smaller sized drive member, reducing the cost of the magnetic drive system and reducing the amount of space required within an elevator hoistway for the magnetic drive.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of making a rotary magnetic drive member, the method comprising:
    establishing a plurality of magnet retainers on a rod using wire arc additive manufacturing; and
    inserting magnets between the magnet retainers with magnetic poles of axially adjacent ones of the magnets oriented with like poles facing toward a portion of one of the magnet retainers between the adjacent ones of the magnets, wherein inserting the magnets comprises positioning at least one of the magnets at least partially in a gap between ends of the magnet retainers near one end of the rod and
    moving the at least one of the magnets within the gap in a helical direction along the rod toward an opposite end of the rod into a desired location.

2. The method of claim 1, wherein the magnet retainers comprise a magnetic material.

3. The method of claim 2, wherein the magnetic material comprises low carbon steel.

4. The method of claim 1, comprising shaping the magnet retainers to include a retention feature on the magnet retainers, the retention feature maintaining the magnets near the rod.

5. The method of claim 4, wherein
    shaping the magnet retainers comprises removing a portion of the magnet retainers to establish a first axial distance between the magnet retainers distal from the rod and a second axial distance between the magnet retainers near the rod; and
    the first axial distance is smaller than the second axial distance.

6. The method of claim 5, wherein removing the portion of the magnet retainers comprises machining away the portion of the magnet retainers.

7. The method of claim 4, wherein shaping the magnet retainers comprises providing the magnet retainers with a dovetail shaped cross-section.

8. The method of claim 1, wherein establishing the plurality of magnet retainers comprises arranging the magnet retainers in a helical arrangement on the rod.

9. The method of claim 1, comprising
sequentially performing the positioning for each of the magnets; and
subsequent to positioning at least some of the magnets, moving the at least some of the magnets simultaneously within the gap in the helical direction along the rod.

10. The method of claim 1, wherein the rod comprises a non-magnetic material.

11. The method of claim 10, wherein the rod comprises a hollow cylinder.

12. The method of claim 1, wherein the magnets comprise a ceramic compound.

13. The method of claim 1, wherein the magnets comprise rare earth magnets.

\* \* \* \* \*